(12) United States Patent
Mischereit et al.

(10) Patent No.: US 8,444,089 B2
(45) Date of Patent: May 21, 2013

(54) PRESSURE BULKHEAD AND METHOD FOR SUBDIVISION OF AN AIRCRAFT OR SPACECRAFT

(75) Inventors: Stephan Mischereit, Winsen (DE); Andreas Stephan, Fredenbeck (DE)

(73) Assignee: Airbus Operations GmbH, Hamburg (DE)

( * ) Notice: Subject to any disclaimer, the term of this patent is extended or adjusted under 35 U.S.C. 154(b) by 384 days.

(21) Appl. No.: 12/678,723

(22) PCT Filed: Jun. 18, 2008

(86) PCT No.: PCT/EP2008/057700
§ 371 (c)(1),
(2), (4) Date: May 20, 2010

(87) PCT Pub. No.: WO2009/037008
PCT Pub. Date: Mar. 26, 2009

(65) Prior Publication Data
US 2010/0230539 A1    Sep. 16, 2010

Related U.S. Application Data

(60) Provisional application No. 60/973,286, filed on Sep. 18, 2007.

(30) Foreign Application Priority Data

Sep. 18, 2007  (DE) .......................... 10 2007 044 388

(51) Int. Cl.
*B64C 1/10*    (2006.01)
(52) U.S. Cl.
USPC .......................... 244/119; 244/121; 244/118.5

(58) Field of Classification Search
USPC .................. 244/118.1, 118.2, 119, 120, 121, 244/118.5
See application file for complete search history.

(56) References Cited

U.S. PATENT DOCUMENTS 4,674,712 A * 6/1987 Whitener et al. ............. 244/119
4,728,059 A * 3/1988 Stephen et al. ............... 244/119
(Continued)

FOREIGN PATENT DOCUMENTS

DE    60029963    2/2007
EP    1196325    8/2006
(Continued)

OTHER PUBLICATIONS

English translation of Office Action issued Oct. 12, 2012 in connection with Japanese Patent Application No. 2010-524422.

*Primary Examiner* — Benjamin P Lee
(74) *Attorney, Agent, or Firm* — Occhiuti Rohlicek & Tsao LLP

(57) ABSTRACT

The present invention provides a pressure bulkhead for subdivision of an aircraft or spacecraft into an internal and an external pressure region. The pressure bulkhead comprises a pressure plate having an edge shaped so as to correspond to an inner contour of the aircraft or spacecraft, a supporting means which tiltably supports the edge on the inner contour, and a seal which seals the edge with the inner contour. A further aspect of the invention provides a method for subdivision of an aircraft or spacecraft into an internal and an external pressure region. Firstly, a pressure plate is provided that has an edge shaped so as to correspond to an inner contour of the aircraft or spacecraft. In further steps, the edge is tiltably supported on the inner contour and sealed with the inner contour.

21 Claims, 4 Drawing Sheets

U.S. PATENT DOCUMENTS

| | | | | |
|---|---|---|---|---|
| 5,062,589 A | * | 11/1991 | Roth et al. | 244/117 R |
| 5,899,412 A | * | 5/1999 | Dilorio et al. | 244/119 |
| 6,276,866 B1 | * | 8/2001 | Rutan | 403/375 |
| 6,378,805 B1 | * | 4/2002 | Stephan et al. | 244/119 |
| 6,478,254 B2 | * | 11/2002 | Matsui et al. | 244/119 |
| 6,494,404 B1 | * | 12/2002 | Meyer | 244/118.2 |
| 7,258,303 B2 | * | 8/2007 | Bouchet et al. | 244/118.1 |
| 8,033,503 B2 | * | 10/2011 | Basso | 244/119 |
| 8,181,909 B2 | * | 5/2012 | Kondo | 244/119 |
| 8,226,870 B2 | * | 7/2012 | Garcia Laja et al. | 264/241 |
| 2001/0035118 A1 | * | 11/2001 | Matsui et al. | 114/78 |
| 2008/0179459 A1 | * | 7/2008 | Garcia Laja et al. | 244/119 |
| 2009/0242701 A1 | * | 10/2009 | Kondo | 244/121 |
| 2010/0065685 A1 | * | 3/2010 | Basso | 244/119 |
| 2010/0230539 A1 | * | 9/2010 | Mischereit et al. | 244/119 |
| 2011/0233334 A1 | * | 9/2011 | Stephan | 244/119 |
| 2011/0290940 A1 | * | 12/2011 | Noebel et al. | 244/121 |

FOREIGN PATENT DOCUMENTS

| | | |
|---|---|---|
| GB | 576091 | 7/1943 |
| JP | 2234897 | 9/1990 |
| JP | 7291197 | 11/1995 |
| JP | 2001315696 | 11/2001 |
| WO | 99/24316 | 5/1999 |

* cited by examiner

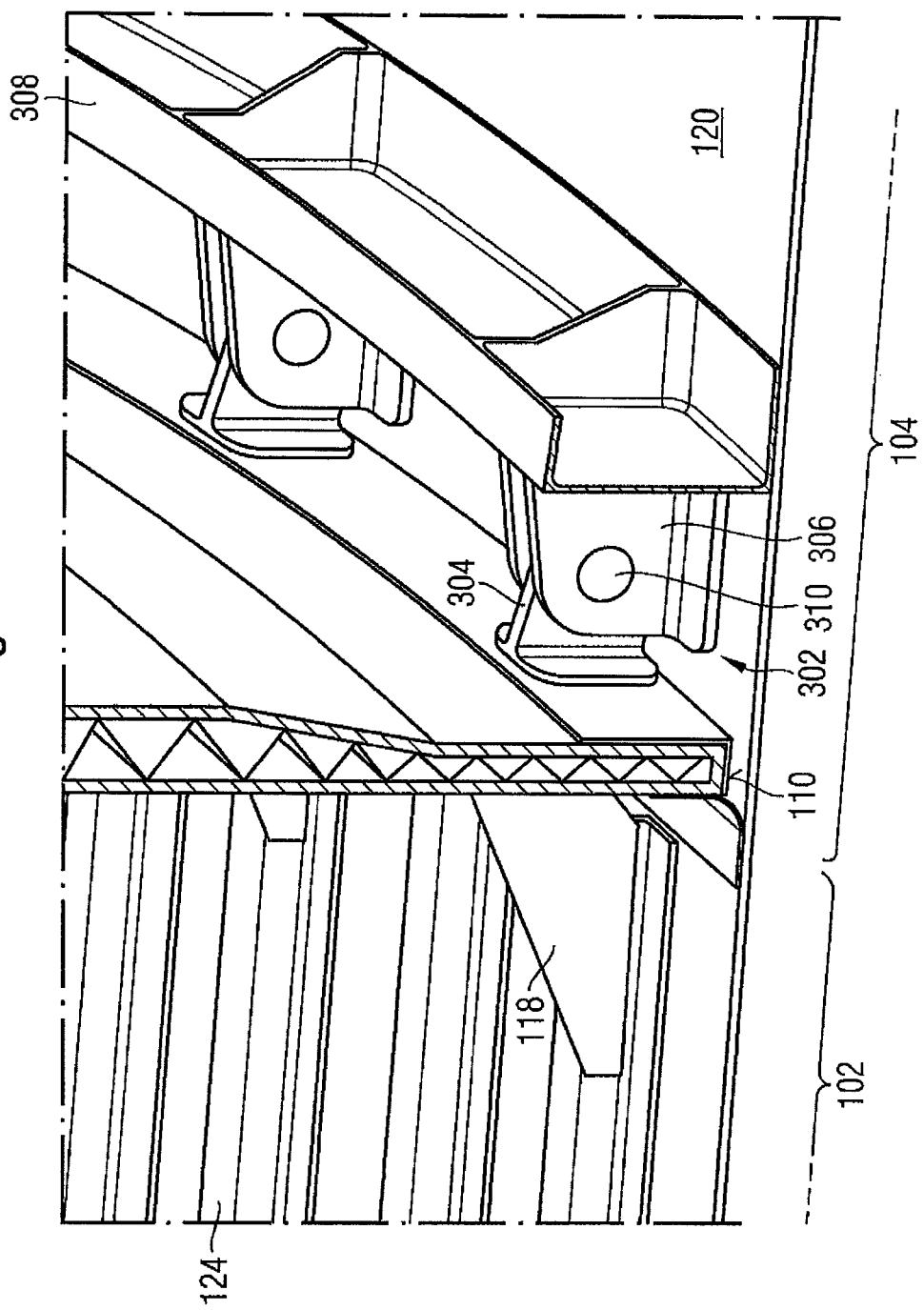

PRESSURE BULKHEAD AND METHOD FOR SUBDIVISION OF AN AIRCRAFT OR SPACECRAFT

CROSS-REFERENCE TO RELATED APPLICATIONS

This application is the National Stage of International Application No. PCT/EP2008/057700, filed on Jun. 18, 2008, which claims the priority of German Patent Application No. 10 2007 044 388.0, filed on Sep. 18, 2007 and U.S. Provisional Patent Application No. 60/973,286, filed Sep. 18, 2007. The contents of the applications are hereby incorporated by reference in their entirety.

The present invention relates to a pressure bulkhead for subdivision of an aircraft or spacecraft. The invention further relates to a structural component and an aircraft or spacecraft with a pressure bulkhead of this type, and also to a method for subdivision of an aircraft or spacecraft.

Although applicable to subdivisions of any desired vehicles or containers, the present invention and also the problems underlying it will be described in greater detail in relation to the rear pressure bulkhead of an aircraft.

In aircraft flying at very high altitudes, such as for example modern commercial aircraft, the passenger compartment, cockpit and cargo hold are generally designed as a pressure tight cabin within which it is possible to maintain during flight an air pressure which is greater than the external pressure and allows passengers and crew to survive without oxygen masks or similar respiratory equipment. In order to close off a pressurised cabin of this type toward the back of the fuselage, it is conventional to install in the rear region of the fuselage a hermetic partition which is referred to as a pressure bulkhead and subdivides the interior of the fuselage into a front portion, which forms the pressurised cabin, and a rear portion, in which for example an auxiliary drive for generating electrical energy and compressed air is accommodated.

A pressure bulkhead of this type can for example be designed in the form of a flat wall which is conventionally made of an aluminium alloy and is riveted in the manner of a former to the outer skin and in this way discharges its loads, both forces and bending moments, into the surrounding structure. As the pressure differential between the pressurised cabin and outside air fluctuates greatly each time the flight altitude changes and in particular during the cyclically occurring take-offs and landings, the bending moments introduced into the outer skin, for example, lead to correspondingly cyclically variable deformation of the outer skin and thus contribute to material fatigue.

Other designs of pressure bulkheads use the shape of a doubly curved spherical shell portion or a spherical cap, for example, which are arched toward the back of the fuselage in order in this way to reduce internal stresses in the material of the pressure bulkhead and the outer skin. This is set against an increase, caused by the arching, in the space required for the pressure bulkhead.

It is therefore the object of the present invention to disclose a design for a pressure bulkhead that, while requiring little space, reduces the introduction of mechanical stresses into the surrounding structure.

According to the invention, this object is achieved by a pressure bulkhead having the features of patent claim 1, by a structural component having the features of patent claim 20, an aircraft or spacecraft having the features of patent claim 21, and also by a method for subdivision of an aircraft or spacecraft into an internal pressure region and an external pressure region having the features of patent claim 22.

The idea underlining the present invention consists in using, to form the pressure bulkhead, a pressure plate having an edge shaped so as to correspond to an inner contour of the aircraft or spacecraft, the edge being tiltably supported on the inner contour and sealed. As the edge is supported tiltably, only forces, but no bending moments, are transmitted between the pressure plate and outer skin of the aircraft or spacecraft at the supporting point. Deformation of the pressure plate, which occurs when the pressure differential between the internal pressure region and external pressure region changes, therefore leads only to local tilting of the edge of the pressure plate in relation to the outer skin, i.e. to variation of the angle enclosed between respective tangential faces of the outer skin and the pressure plate at the common supporting point.

The fact that the tiltable supporting does not transmit any bending moments into the outer skin prevents mechanical stresses and thus deformation and material fatigue of the outer skin. This does not require the pressure plate to be arched, so the pressure bulkhead requires little space and the amount of space that can actually be used in the aircraft increases.

The sub-claims contain advantageous configurations and improvements of the invention.

According to a preferred development of the pressure bulkhead according to the invention, an annular element is also provided that borders the pressure plate along its edge. The edge is supported by the supporting means in this case on the annular element, and the seal seals the annular element with the inner contour. The annular element imparts additional stability to the pressure plate. Preferably, the annular element comprises as a material steel, titanium, aluminium or carbon fibre reinforced plastics material.

Preferably, the annular element has an L-shaped profiled part with a first and a second profiled part leg. In this case, the first profiled part leg extends parallel to the main plane of the pressure plate and rests against the pressure plate on sides of the external pressure region. This leg supports the plate in the direction toward the external pressure region and absorbs the forces acting on the plate when, during flight, the internal pressure is higher than the external pressure. The second profiled part leg extends perpendicularly to the main plane of the pressure plate along the edge thereof. This leg comprises the edge of the plate, so said plate is retained in the annular element in a stable manner and cannot move laterally.

According to a preferred development, the pressure plate is embodied to be retained in the annular element by a pressure differential between the internal pressure region and the external pressure region. This allows the edge of the plate to move in relation to the annular element if, for example, the plate is deformed by the action of the pressure differential between the internal pressure region and external pressure region. This prevents deformation of the annular element itself, thus further reducing the introduction of stresses into the surrounding structure.

According to a further preferred development, the pressure plate is riveted, screwed or adhesively bonded to the annular element. This allows the connection between the plate and annular element to be made particularly stable and tight.

According to a preferred development, counter supports are also provided that support the pressure plate toward the internal pressure region. This has the advantage that the pressure plate is securely retained even when there is no pressure differential between the internal pressure region and external pressure region, such as is for example regularly the case on the ground.

According to a preferred development, the supporting means comprises at least one pull tab extending from the edge of the pressure plate along an inner face of an outer skin of the aircraft or spacecraft into the internal pressure region. In this case, the pull tab is fastened by one end to the pressure plate and by another end to the outer skin. As a pull tab arranged in this way discharges substantially only tangential tensile forces into the outer skin, deformation and stressing of the outer skin are prevented in a particularly effective manner. As the pull tab is, in addition, fastened at its respective ends, its middle portion remains freely deformable and can yield to deformation of the edge of the pressure plate or the annular element without discharging said deformation into the outer skin.

Preferably, the pull tab is fastened to the outer skin by riveting. The rivets ensure a safe introduction of force and are ideally loaded almost purely with shear forces. Preferably, the pull tab is fastened to the outer skin below a stringer of the aircraft or spacecraft, allowing force to be introduced in a manner that is particularly gentle on the outer skin.

According to a preferred development, the supporting means comprises at least one articulated element. In this case, a first articulated arm is fastened to the edge of the pressure plate; a second articulated arm is fastened to an outer skin of the aircraft or spacecraft. Articulated elements of this type allow high forces to be discharged into the outer skin and at the same time to particularly reliably rule out, as a result of the pivotability of the articulated arms relative to one another, any transmission of bending moments.

Preferably, the second articulated arm is fastened to a reinforcing element which reinforces the outer skin in the external pressure region. For example, the second articulated arm can be attached to a former extending behind the pressure bulkhead in the external pressure region, allowing force to be reliably introduced into the surrounding structure.

Preferably, the articulated element also comprises a joint bolt extending substantially in a direction which is tangential to the edge of the pressure plate in the region of the fastening of the first articulated arm. A bolt oriented in this way selectively allows the edge of the pressure plate to tilt in relation to the outer skin toward the outer skin region if the pressure plate warps on account of a pressure differential between the internal pressure region and external pressure region. At the same time, contortions in other directions are prevented and the stability of the overall structure is in this way increased. Preferably, the first and/or second articulated arms comprise an aluminium and/or steel material, so high forces are reliably transmitted. The joint bolt preferably comprises a steel material.

According to a preferred development, the pressure plate is embodied as a sandwich component. Preferably, the sandwich component comprises a core having a honeycomb structure and/or a foam material, and also a cover layer comprising a carbon fibre reinforced plastics material, a glass reinforced plastics material and/or an aluminium material. A sandwich component of this type is distinguished by high flexural strength at low dead weight.

Preferably, the pressure plate is embodied so as to be more rigid in a central region than at the edge, for example as a result of a thicker core or additionally laminated-on cover layers. This allows the inevitable deformation of the pressure plate under the action of the pressure differential to be minimised and the weight of the pressure plate to thereby be kept low.

The invention will be described hereinafter in greater detail based on embodiments and with reference to the appended figures of the drawings, in which:

FIG. 4 is a perspective view of a detail of the structural component from FIG. 3.

In the figures, unless otherwise stated, like reference numerals denote identical or functionally identical components.

Figure 1:
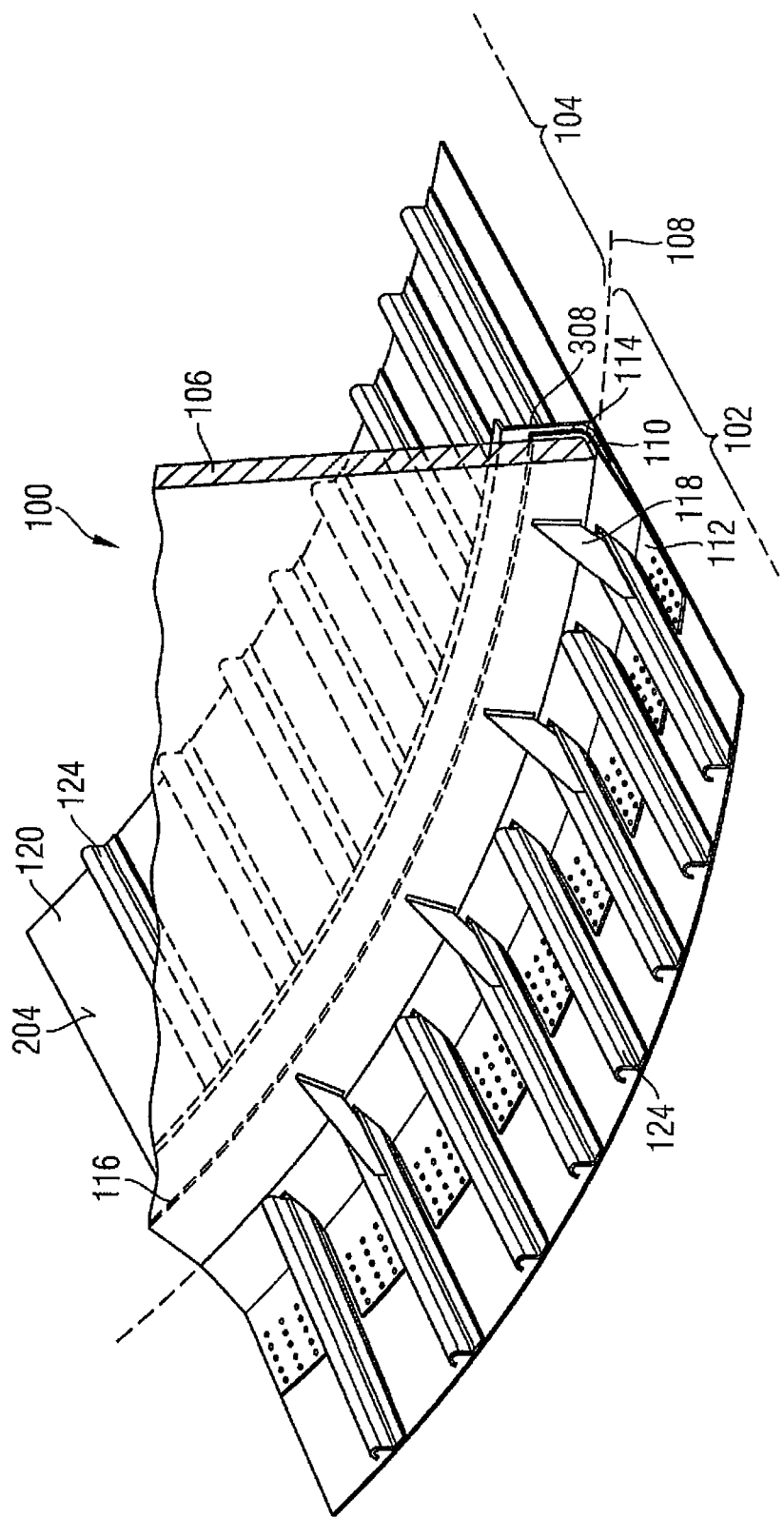
FIG. 1 is a perspective detail-based view of a pressure bulkhead according to a first embodiment of the invention.

FIG. 1 is a perspective internal view of a detail of the hull of a fuselage. The outer skin 120 of the hull is reinforced at its inner face 204 by stringers 124 extending in the longitudinal direction of the aircraft and formers 308 extending perpendicularly thereto along the circumference of the fuselage.

A pressure bulkhead 100, which subdivides in a pressure tight manner the fuselage along an inner contour 108 into an internal pressure region 102 and an external pressure region 104, is located in the region of the illustrated detail. For example, the internal pressure region 102 consists of a pressurised cabin 102 comprising the passenger compartment, the cargo hold and the cockpit, whereas the external pressure region 104 is for example a space 104 which is positioned at the tail of the aircraft, behind the pressurised cabin 102, and is used to accommodate an auxiliary drive.

The pressure bulkhead 100 comprises a pressure plate 106, the edge 110 of which extends along the inner contour 108, so the cross-section of the fuselage is filled out substantially by the pressure plate 106 at the position defined by the inner contour. For the sake of clarity, the pressure plate is shown in transparent form in FIG. 1, so the portions of the stringers 124 and the formers 308 that are arranged in the external pressure region 104 are visible in FIG. 1. The pressure plate 106 is designed as a sandwich component, i.e. it consists of a core having a foamed, honeycomb or similar structure and cover layers which are located on both sides and absorb tensile and compressive force. Carbon fibre or glass reinforced plastics material or a metal sheet made of an aluminium alloy can for example be used for the cover layers.

The edge of the pressure plate 106 is bordered by an annular element 116 which has an L-shaped profiled part and supports the pressure plate 106 both in the direction of the external pressure region 104 and in the radial direction of the fuselage, i.e. in the direction toward the outer skin 120. Suitable materials for the annular element 116 are steel, titanium, aluminium or carbon fibre reinforced plastics material. The edge 110 of the pressure plate 106 can optionally be adhesively bonded, screwed or riveted to the annular element 116.

The annular element 116 is connected to the outer skin 120 via pull tabs 112 which are riveted by one end to the annular element 116, extend along the inner face 204 of the outer skin 120 into the internal pressure region 102 and are fastened in the internal pressure region to the outer skin 120 by means of rivets 122. Suitable materials for the pull tabs 112 are for example steel or titanium. A seal 114, which is made for example of rubber, is inserted between the annular element 116 and the former 308 resting on the outer skin 120 and seals the annular element 116 from the outer skin 120.

During flight operation, the higher the flight altitude of the aircraft, the more the air pressure in the external pressure region 104 falls. An air pressure greater than the external pressure is maintained in the internal pressure region 102, resulting in the build-up of a pressure differential between the internal pressure region 102 and external pressure region 104 that exerts on the pressure plate 106 a force directed in the direction of the external pressure region 104. This force presses the pressure plate 106 into the annular element 116, so the pressure plate 106 is retained in the annular element 116 even without riveting, a screw connection or adhesive bonding. The annular element 116 absorbs the press-on force of the pressure plate 106 in the direction of the external pressure region 104 and introduces it, as a tensile force extending parallel to the outer skin 120, into the outer skin 120 via the pull tabs 112.

In order to securely retain the pressure plate 106 in the annular element 116 even when, for example while the aircraft is on the ground, there is no pressure differential between the internal pressure region 102 and external pressure 104 of the aircraft, counter supports 118 are also provided that are fastened to the stringers on sides of the internal pressure region 102 at uniform intervals and support the pressure plate 106 in the direction of the internal pressure region 102.

The supporting of the pressure plate 106 will be described in greater depth based on a detail shown in FIG. 2 of the structural component from FIG. 1. The L-shaped profiled part of the annular element 116 is formed by a first profiled part leg 200, which supports the pressure plate 106 in the direction of the external pressure region 104, and a second profiled part leg 202, which borders the edge 110 of the pressure plate 106. An inner seal (not shown), which is made of a rubber or foam material, for example, and prevents air from escaping from the internal pressure region 102 through any remaining gaps between the pressure plate 106 and the annular element 116, can be provided between the pressure plate 106 and the annular element 116. The sealing of the pressure plate 106 with the annular element 116 can for example also be achieved by adhesively bonding the pressure plate to the annular element.

The pull tab 112 is, starting from the internal pressure region 102, guided around both legs 202, 200 of the annular element 116 and fastened, for example by riveting using rivets (not shown here), by the annular element 116 to the first leg 200 or to both legs 200, 202. When a pressure differential 206 between the internal pressure region 102 and external pressure region 104 is applied to the pressure plate 106, the pull tab 112 is loaded with tensile force. The rivets 122, by which the pull tab 112 is fastened to the outer skin 120, as well as the rivets (not shown) by which the pull tab 112 is fastened to the annular element 116 are in this case loaded almost exclusively with shear forces.

If, during flight operation, the pressure differential 206 causes arching, which is inevitable at least to a low degree, of the pressure plate 106 in the direction of the external pressure region 104, tilting moments, which seek to tilt the edge 110 of the pressure plate 106 in the direction of the external pressure region 104, occur in the region of the edge 110. However, these tilting moments are not discharged by the pull tab 112 into the outer skin 120, so the outer skin 120 is not warped. The tensile loading of the pull tabs 112 stretches them lengthwise, so the annular element 116 moves slightly in the direction of the external pressure region 104 and, in doing so, presses the seal 114 against the former 308.

Figure 2:
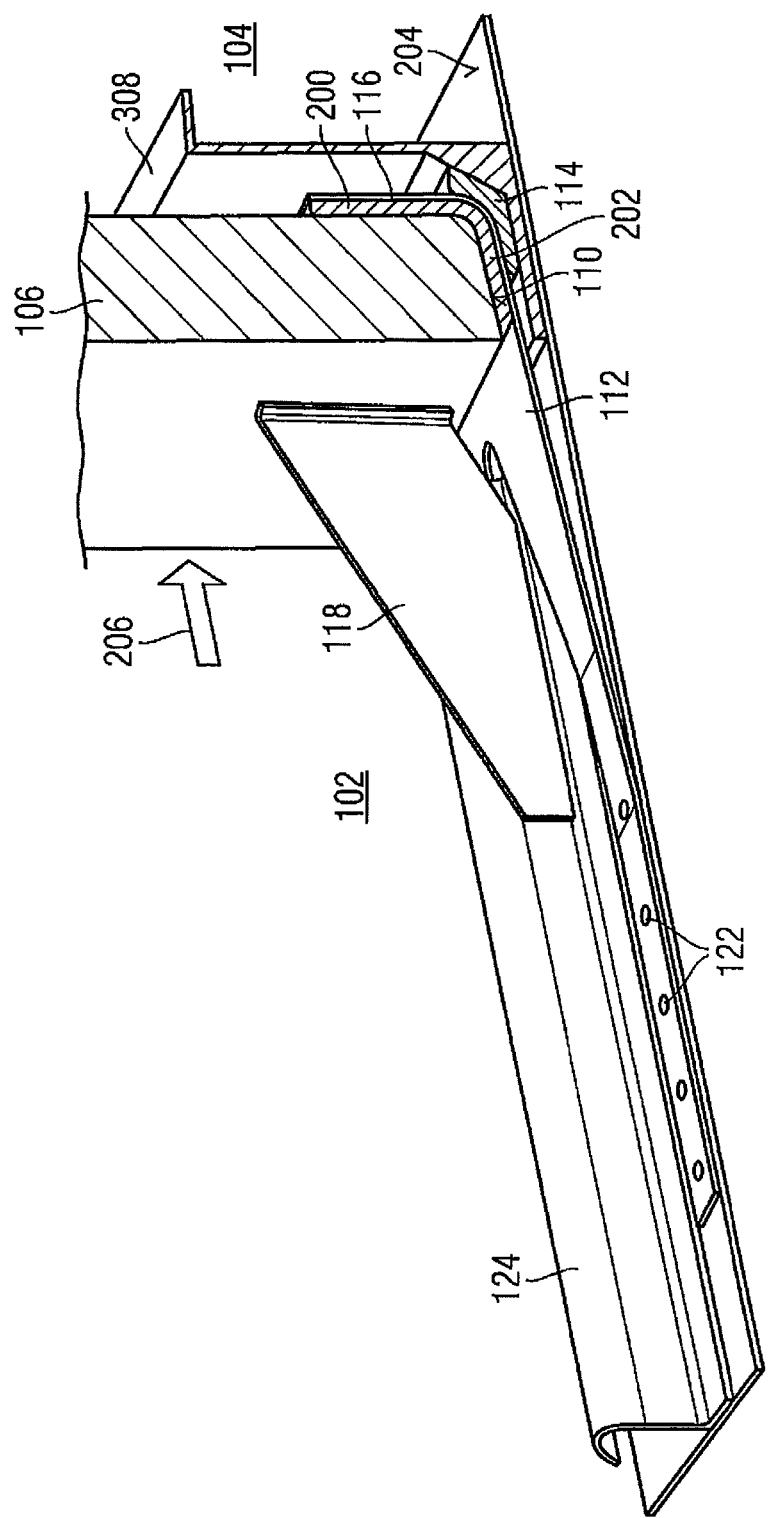
FIG. 2 is a perspective view of a detail of the structural component from FIG. 1.
Figure 3:
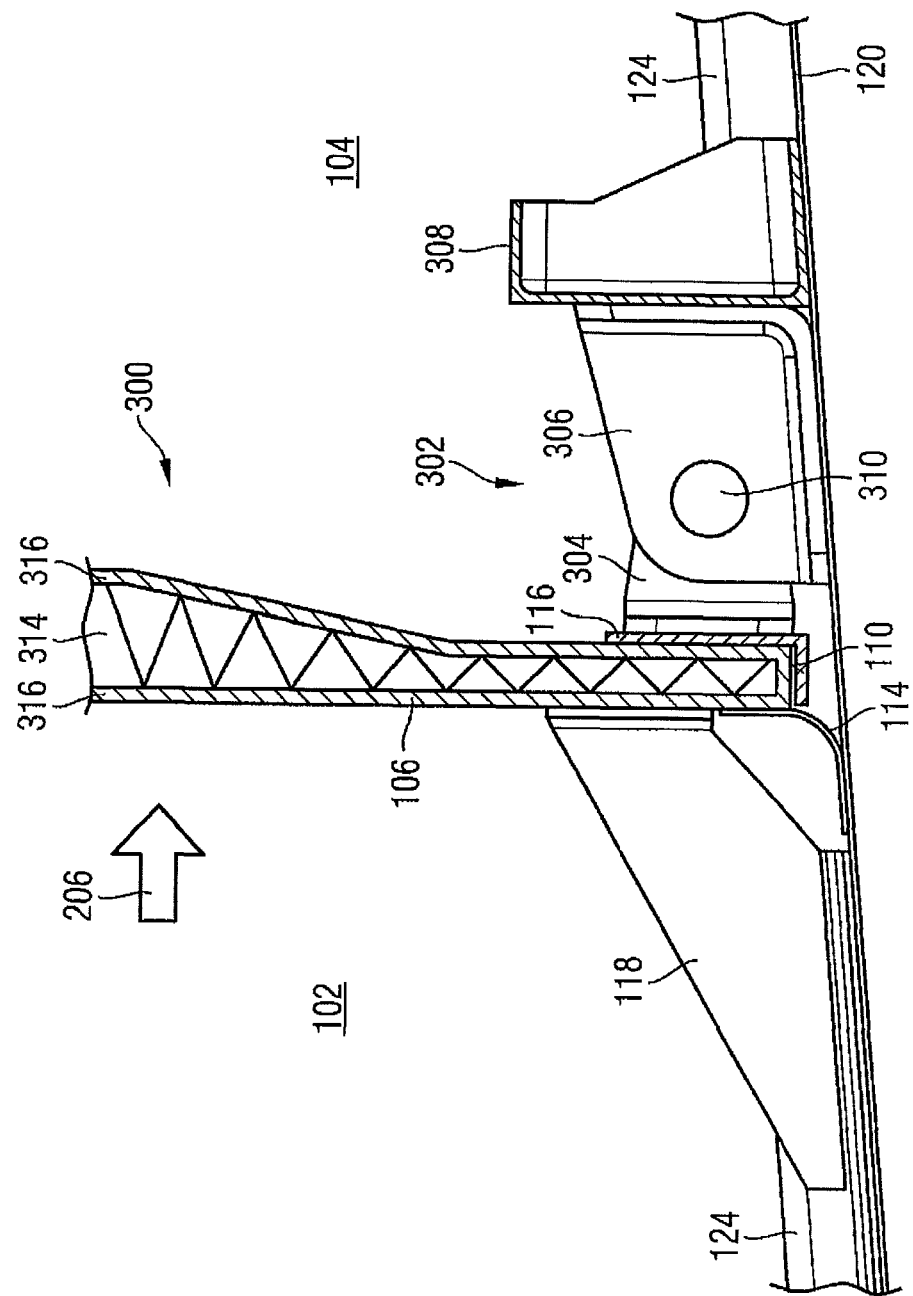
FIG. 3 is a cross-sectional view of a pressure bulkhead according to a second embodiment of the invention.

FIG. 3 is a detailed cross-sectional view of the fastening of a pressure bulkhead according to a second embodiment. As in the first embodiment shown in FIGS. 1 and 2, the pressure bulkhead comprises a pressure plate 106 which is retained in an annular element 116 with an L-shaped profiled part. Counter supports 118 are also provided that are fastened to the stringers 124 and prevent the pressure plate 106 from falling out of the annular element 116, wherein the pressure plate can optionally be adhesively bonded, screwed or riveted to the annular element 116. The pressure plate 106 is designed as a sandwich component 106 having a folded honeycomb structure 314 enclosed between two cover layers 316. Both the folded honeycomb structure 314 and the cover layers 316 are designed so as to be thicker in a central region 300 of the pressure plate 106 than at the edge 110; this increases the rigidity of the pressure plate 106 in the central region 300 and in this way imparts to the pressure plate 106 the property of deforming just slightly under the action of the pressure differential 206.

In contrast to the embodiment from FIGS. 1 and 2, the annular element 116 is supported in relation to the outer skin 120 and the former 308 reinforcing the outer skin by means of an articulated element 302 arranged in the external pressure region 104 between the annular element 116 and the former 308. The articulated element 302 comprises a first articulated arm 304 which is riveted or screwed to the leg of the annular element 116 that extends parallel to the pressure plate 106. A second articulated arm 306 is supported both in relation to the outer skin 120 and in relation to the former 308 and fastened thereto, for example by riveting. Both articulated arms 304, 306 are connected so as to be able to pivot relative to each other via a joint bolt 310 extending parallel to the pressure plate 306 and to the local tangent to the outer skin 120.

In contrast to the first embodiment, a seal 114, which is made for example of rubber and seals the annular element 116 with the outer skin, is arranged in the internal pressure region 102 and is pressed onto the outer skin 120 and annular element 116 directly as a result of the pressure differential 206.

In the second embodiment shown in FIG. 3, the supporting of the pressure plate 106 is further clarified by the perspective view in FIG. 4. Articulated elements 302 are arranged at uniform intervals along the circumference of the fuselage, the joint bolts each being oriented parallel to the local tangent to the outer skin and thus being directed slightly differently from the joint bolt of the respectively adjacent articulated element 302. The second articulated arms 306 of the articulated elements 302 are each designed as an eyebolt fork 302, between the prongs of which the respectively associated first articulated arm 304 is inserted and articulated by the joint bolt 310. The joint bolts are made of steel, for example; the articulated arms 304, 306 are also made of steel or of aluminium.

During flight operation, the pressure bulkhead experiences, as a result of the action of the pressure differential between the external pressure region 102 and internal pressure region 104, inevitable deformation leading to local tilting of the edge 110 of the pressure plate 106 in relation to the outer skin 120 in the direction of the external pressure region 104. The articulated elements 302 allow corresponding tilting of their articulated arms 304, 306 relative to each other, so the deformation of the pressure plate does not transmit any bending moments into the outer skin 120.

Although the present invention has in the present document been described based on preferred embodiments, it is not limited thereto, but can be modified in a broad range of ways.

For example, it is possible for the pull tabs not or not only to be arranged between the stringers and riveted to the outer skin, as shown for the first embodiment; on the contrary, alternatively or additionally, they can be guided under the stringers, between the stringer and outer skin, and riveted to both. It is also possible to provide a single pull tab, in the form of an approximate cylinder sheath, extending around the entire fuselage. Furthermore, pull tabs and articulated elements can for example be provided combined in one embodiment, in the same or different portions of the inner contour of the fuselage.

A pressure plate can also be designed in a plurality of parts, a first part closing off a cargo hold below a passenger floor and a second part closing off a passenger compartment above the passenger floor, for example. Seals can be designed in a broad range of ways, including for example as rubber hollow profiled parts which are opened toward the internal pressure region and inflate as the pressure falls in the external pressure region.

LIST OF REFERENCE NUMERALS

100 Pressure bulkhead
102 Internal pressure region
104 External pressure region
106 Pressure plate
108 Inner contour of the aircraft or spacecraft
110 Edge of the pressure plate
112 Pull tab
114 Seal
116 Annular element
118 Counter support
120 Outer skin
122 Rivets
124 Stringer
200 First profiled part leg
202 Second profiled part leg
204 Inner face
206 Pressure differential
300 Central region of the plate
302 Articulated element
304 First articulated arm
306 Second articulated arm
308 Former
310 Joint bolt
314 Core
316 Cover layer

The invention claimed is:

1. A pressure bulkhead for subdivision of an aircraft or spacecraft into an internal pressure region and an external pressure region, comprising:
a pressure plate having an edge shaped so as to correspond to an inner contour of the aircraft or spacecraft;
a supporting means which tiltably supports the edge on the inner contour;
a seal which seals the edge with the inner contour,
wherein the supporting means comprises at least one pull tab extending from the edge of the pressure plate along an inner face of an outer skin of the aircraft or spacecraft into the internal pressure region; and
wherein the pull tab is fastened by one end to the pressure plate and by another end to the outer skin.

2. The pressure bulkhead according to claim 1, wherein an annular element is also provided that borders the pressure plate along its edge, the supporting means supporting the annular element on the inner contour and the seal sealing the annular element with the inner contour.

3. The pressure bulkhead according to claim 1, wherein the annular element comprises steel, titanium, aluminum or carbon fibre reinforced plastics material.

4. The pressure bulkhead according to claim 1, wherein the annular element has an L-shaped profiled part, comprising:
a first profiled part leg extending parallel to the pressure plate on sides of the external pressure region on the pressure plate; and
a second profiled part leg extending perpendicularly to the pressure plate along the edge thereof.

5. The pressure bulkhead according to claim 1, wherein the pressure plate is embodied to be retained in the annular element by a pressure differential between the internal pressure region and the external pressure region.

6. The pressure bulkhead according to claim 1, wherein the pressure plate is riveted, screwed or adhesively bonded to the annular element.

7. The pressure bulkhead according to claim 1, wherein counter supports are also provided that support the pressure plate toward the internal pressure region.

8. The pressure bulkhead according to claim 1, wherein the pull tab is fastened to the outer skin by rivets.

9. The pressure bulkhead according to claim 1, wherein the pull tab is fastened to the outer skin below a stringer of the aircraft or spacecraft.

10. The pressure bulkhead according to claim 1, wherein the supporting means comprises at least one articulated element, comprising:
a first articulated arm which is fastened to the edge of the pressure plate; and
a second articulated arm which is fastened to an outer skin of the aircraft or spacecraft.

11. The pressure bulkhead according to claim 10, wherein the second articulated arm is fastened to a reinforcing element which reinforces the outer skin in the external pressure region.

12. The pressure bulkhead according to claim 10, wherein the articulated element further comprises a joint bolt extending substantially in a direction tangential to the edge of the pressure plate in the region of the fastening of the first articulated arm.

13. The pressure bulkhead according to claim 10, wherein the first and/or second articulated arms comprise aluminum and/or steel material.

14. The pressure bulkhead according to claim 10, wherein the joint bolt comprises a steel material.

15. The pressure bulkhead according to claim 1, wherein the pressure plate is embodied as a sandwich component.

16. The pressure bulkhead according to claim 15, wherein the sandwich component comprises a core having a honeycomb structure and/or a foam material.

17. A pressure bulkhead according to claim 15, wherein the sandwich component has at least one cover layer comprising a carbon fibre reinforced plastics material, a glass reinforced plastics material and/or an aluminum material.

18. The pressure bulkhead according to claim 15, wherein the pressure plate is more rigid in a central region than at the edge.

19. A structural component for an aircraft or spacecraft, comprising a pressure bulkhead according to claim 1.

20. An aircraft or spacecraft, comprising the pressure bulkhead according to claim 1.

21. A method for subdivision of an aircraft or spacecraft into an internal pressure region and an external pressure region, including the steps:
providing a pressure plate having an edge shaped so as to correspond to an inner contour of the aircraft or spacecraft;
tiltably supporting the edge on the inner contour via a supporting means;
wherein the supporting means comprises at least one pull tab extending from the edge of the pressure plate along an inner face of the inner contour of the aircraft or spacecraft into the internal pressure region,
wherein the pull tab is fastened by one end to the pressure plate and by another end to the inner contour, and
sealing the edge with the inner contour.

* * * * *